US008383029B2

(12) United States Patent
SeCoy et al.

(10) Patent No.: US 8,383,029 B2
(45) Date of Patent: Feb. 26, 2013

(54) MANUFACTURE OF HIGH STRENGTH, HIGH DENSITY CARRIER PLATE

(75) Inventors: Todd C. SeCoy, Beatty, OR (US); Dale S. Dougherty, Klamath Falls, OR (US); Mikel S. Cole, Klamath Falls, OR (US); Douglas J. Garcia, Beaverton, OR (US); Michelle Wernert, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 439 days.

(21) Appl. No.: 12/389,034

(22) Filed: Feb. 19, 2009

(65) Prior Publication Data

US 2010/0206769 A1 Aug. 19, 2010

(51) Int. Cl.
*B29C 45/14* (2006.01)
(52) U.S. Cl. .................. 264/273; 264/154; 425/577
(58) Field of Classification Search .......... 264/273, 264/154; 425/577; 427/97.2
See application file for complete search history.

(56) References Cited

U.S. PATENT DOCUMENTS

| 4,102,043 A | 7/1978 | Andrade et al. |
| 4,526,129 A | 7/1985 | Braden |
| 4,970,781 A * | 11/1990 | Chang et al. ............. 29/843 |
| 5,249,951 A | 10/1993 | Leonhartsberger et al. |
| 5,337,893 A | 8/1994 | Nami et al. |
| 5,894,006 A | 4/1999 | Herbst |
| 5,922,371 A | 7/1999 | Urbanek |
| 6,159,407 A | 12/2000 | Krinke et al. |

FOREIGN PATENT DOCUMENTS

JP 2004017549 A * 1/2004

OTHER PUBLICATIONS

Goshima et al., "Carrier plate manufacture for supporting chip component, involves injecting silicone rubber into preheated metallic molds in which plate is arranged horizontally", JP 2004-017549 A machine translation, Jan. 22, 2004.*
ESI, Work Instruction to operate injection molding machine to manufacture carrier plate, 2004.

* cited by examiner

*Primary Examiner* — Galen Hauth
(74) *Attorney, Agent, or Firm* — Young Basile

(57) ABSTRACT

A carrier plate for supporting electronic components during processing includes hexagonally-arranged holes for supporting the components. Walls of the holes comprise a gripping resilient material. The hexagonal arrangement provides a strong carrier that improves production yield through an increase in per batch processing and improved locational accuracy over conventional carriers.

16 Claims, 4 Drawing Sheets

MANUFACTURE OF HIGH STRENGTH, HIGH DENSITY CARRIER PLATE

FIELD OF THE INVENTION

This invention generally relates to processing miniature electronic components and more specifically to a high strength, high density carrier plate used in processing such components.

BACKGROUND

Electronic components are processed using a wide variety of different electronic component handlers. One such handler is described in, for example, U.S. Pat. No. 4,526,129, entitled Means for Processing Miniature Electronic Components such as Capacitors or Resistors. Therein, a plate is disclosed that supports a number of miniature electronic components for processing, such as applying conductive coatings to opposite ends of each component.

BRIEF SUMMARY

One embodiment of the invention taught herein is a method of manufacturing a carrier plate for supporting a plurality of electronic components. The method comprises supporting a carrier core between a first mold part and a second mold part. The first mold part includes a facing surface facing the carrier core and a first plurality of pins extending therefrom and the second mold part includes a facing surface facing the carrier core and a second plurality of pins extending therefrom. The carrier core includes a frame portion forming an outer peripheral edge of the carrier core, a web portion surrounded by core frame portion and recessed from opposing surfaces of the frame portion facing the facing surfaces of the first mold part and the second mold part and a plurality of hexagonally-arranged bores extending through the web portion and perpendicular to the facing surfaces of the first mold part and the second mold part. Each of the plurality of first and second pins extends through a respective one of the plurality of hexagonally-arranged bores. The method also comprises injecting a resilient material through gates in each of the first mold part and the second mold part to form a molded part and finishing opposing surfaces of the molded part to a desired thickness.

Another embodiment of the invention taught herein is a carrier plate formed according to this method. One carrier plate, for example, includes a carrier core having a frame portion forming an outer peripheral edge of the carrier core, a web portion surrounded by the frame portion and recessed from opposing surfaces of the frame portion and a plurality of hexagonally-arranged bores extending through the web portion. Resilient material lines the plurality of hexagonally-arranged bores and fills each recess formed between opposing surfaces of the web portion such that the resilient material is substantially flush with the opposing surfaces of the web portion.

Additional details and modifications of these and other embodiments of the invention are described in detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
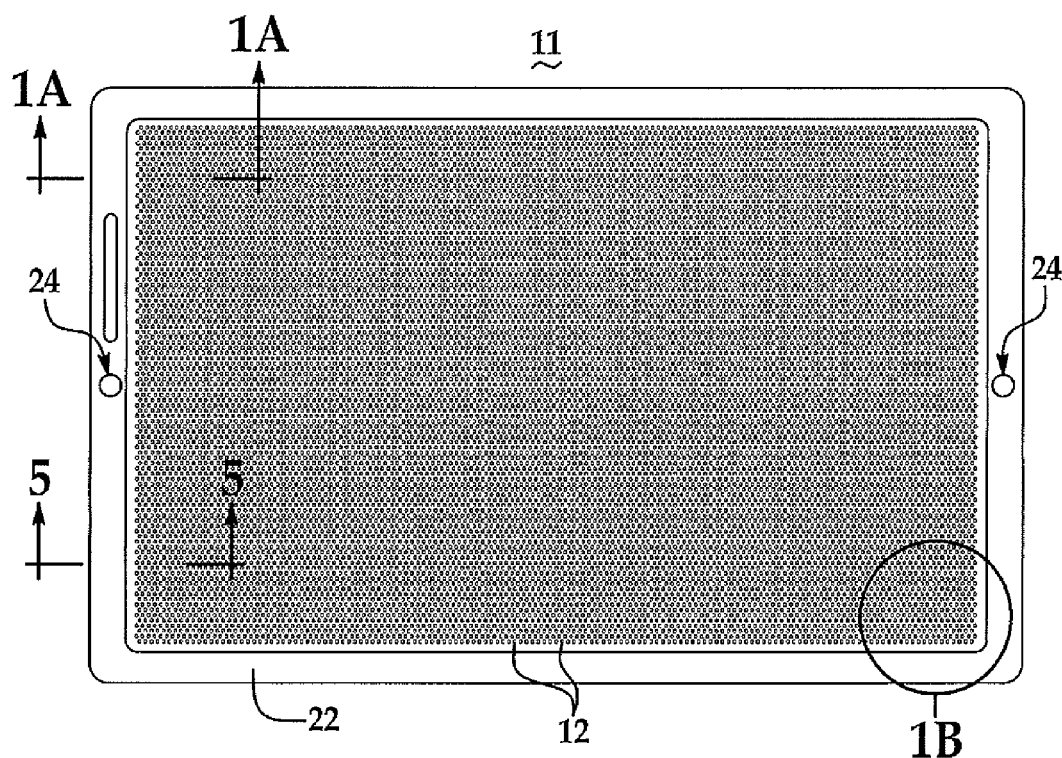
FIG. 1 is a plan view of one embodiment of an inventive carrier plate taught herein.
Figure 1A:
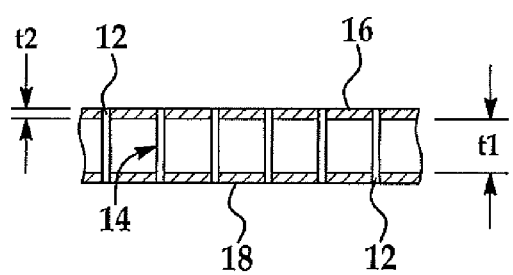
FIG. 1A is a cross-sectional view along line A-A in FIG. 1.
Figure 1B:
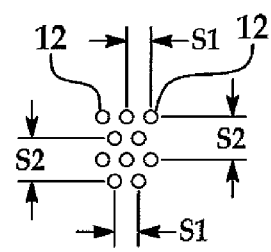
FIG. 1B is an enlarged view of detail B in FIG. 1.

Referring first to FIGS. 1, 1A and 1B, the illustrated carrier plate 11 includes a plurality of support holes 12 for receiving parts. A resilient material 14 defines the walls of each support hole 12 and extends from a top surface 16 to a bottom surface 18 of carrier plate 11 as discussed in additional detail hereinafter.

Figure 2:
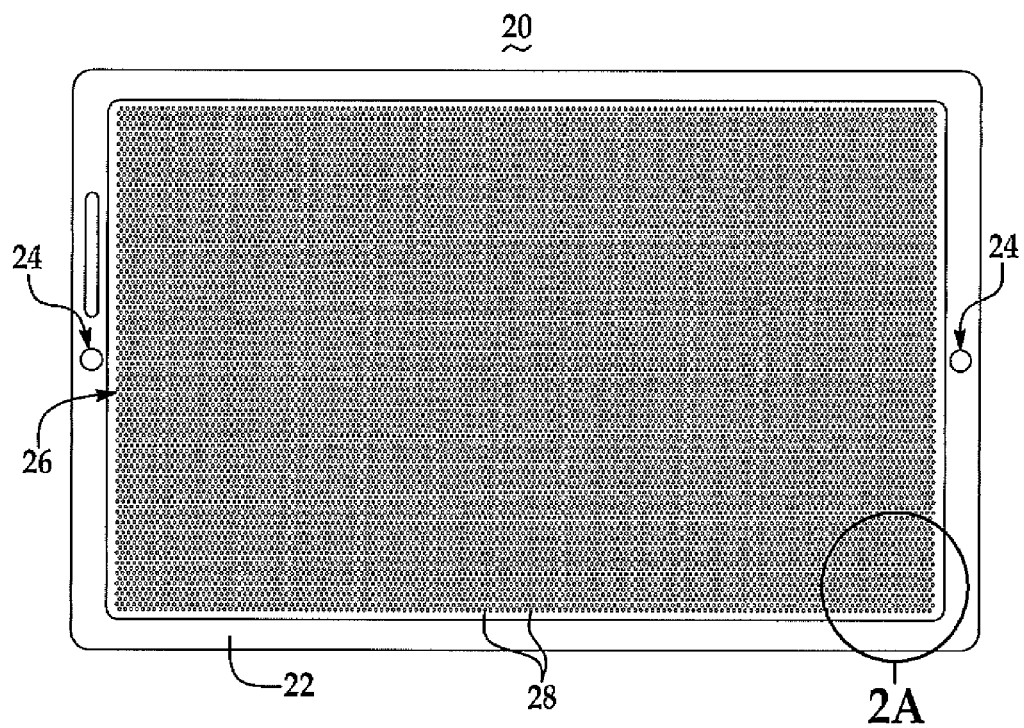
FIG. 2 is a plan view of a carrier plate core of the carrier plate of FIG. 1.
Figure 2A:
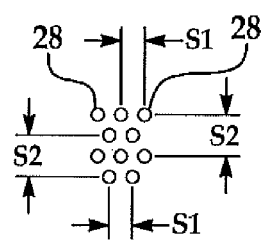
FIG. 2A is an enlarged view of detail A in FIG. 2.
Figure 3:
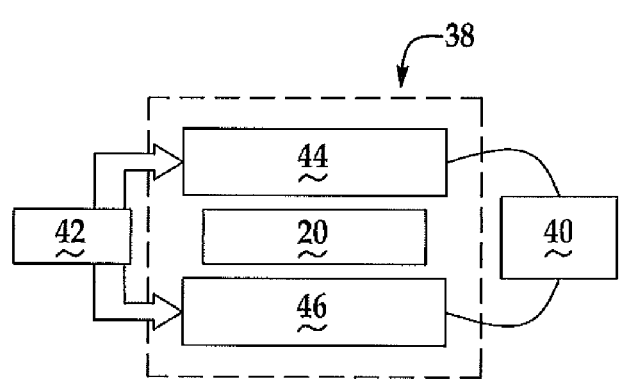
FIG. 3 is a simplified schematic of an apparatus for forming the carrier plate according to FIG. 1.
Figure 4:
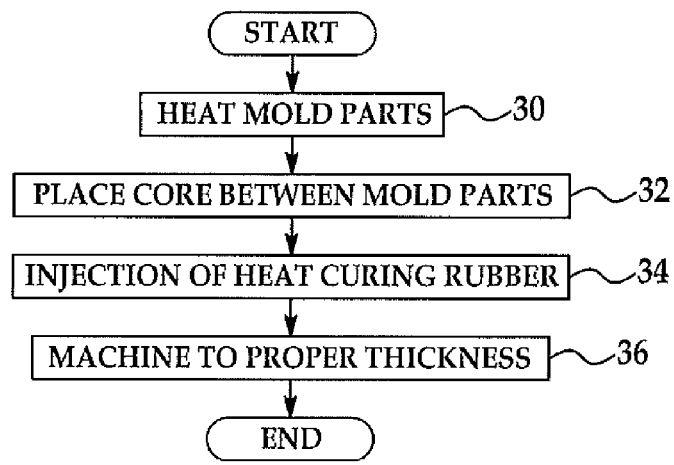
FIG. 4 is a flowchart illustrating one method of forming the carrier plate according to FIG. 1 using the apparatus of FIG. 3.

Carrier plate 11 is formed of a core 20 as shown in FIGS. 2 and 2A. Core 20 can be, for example, an aluminum alloy that is light weight and easily machined. One such aluminum alloy that can be used is 7075-T651, which has a high tensile strength. Core 20, and hence completed carrier plate 11, is generally rectangular in shape to conform to existing processing equipment, such as that discussed hereinafter, but it is not limited thereto. Along the entire outer peripheral edge of core 20 is formed a frame portion 22. The width of frame portion 22 is not particularly limited except that it desirably conforms to that in known plates so as to be easily using in existing processing equipment. On two opposing edges of frame portion 22 are through-holes 24 that align core 20 during manufacture of carrier plate 11 and that align carrier plate 11 during use.

Frame portion 22 defines an inner recess, or web portion 26, of core 20. Web portion 26 comprises multiple bores 28 extending therethrough. Web portion 26 is thinner than frame portion 22. That is, web portion 26 is recessed from both the top and bottom surfaces of frame portion 22 to assist with holding resilient material 14 in place. Bores 28 are formed by, for example, machine or laser drilling according to known methods and techniques.

Carrier plate 11, and hence core 20, is not limited to a particular thickness. However, like the shape thereof, it is desirable if carrier plate 11 is sized to be used in existing processing equipment to reduce capital expenditures associated with using inventive carrier plate 11 in place of conventional plates. Moreover, support holes 12 must be sized to accommodate the length of parts mounted therein. Accordingly, one desirable thickness of carrier plate 11 after finishing is, for example, approximately 0.35 inches (i.e., within a 1% tolerance or less).

Existing part handling plates, such as that described in U.S. Pat. No. 4,526,129, include multiple part receiving passageways arranged in a square pattern. The inventors have noted a number of problems with such an arrangement. First, production rates in existing plate-based component processing are limited by the number of passageways that can be used at any one time to process components. However, increasing the size of such plates in order to process more parts at one time (e.g., increasing production rates) is not feasible due to the large capital investment in existing equipment. Further, maintaining the strength and/or rigidity of the plate would be a serious concern if the number of passageways were increased by merely spacing them closer together.

The inventors address these problems by forming a hexagonal arrangement of the bores 28, and hence a hexagonal arrangement of the support holes 12. In such an arrangement, as shown in FIGS. 1B and 2A, each bore 28 and corresponding support hole 12 (except those at the edges of frame portion 22) has six neighbors at an equal distance S1 surrounding it. Distance S1 is measured from center-to-center, and, in one example, distance S1 is 0.07 inches. In such example, a distance S2 between adjacent aligned rows of bores 28 or holes 12 is approximately 0.123 inches.

Manufacture of carrier plate 11 using core 20 is next described with reference to FIGS. 3-5, 5A and 7.

The first step 30 in manufacturing carrier plate 11 is heating top mold part 44 and bottom mold part 46 using any known heating element 40 of an apparatus 38 for manufacturing a molded component. Mold parts 44, 46 are preferably formed of material to match the thermal expansion characteristics of core 20 and can be made of the same material as core 20. For example, mold parts 44, 46 are made of an aluminum alloy with a high tensile strength such as 7075-T651. Mold parts 44, 46 can be finished with a coating of electroless nickel with poly-tetrafluoroethylene (PTFE). One such material is sold under the tradename Poly-Ond® and is available from Poly-Plating, Inc. of Chicopee, Mass. As is known in the industry, mold parts 44, 46 are mounted to movable supporting structures (not shown in FIG. 3) of the apparatus 38 for movement toward and away from each other.

Figure 5:
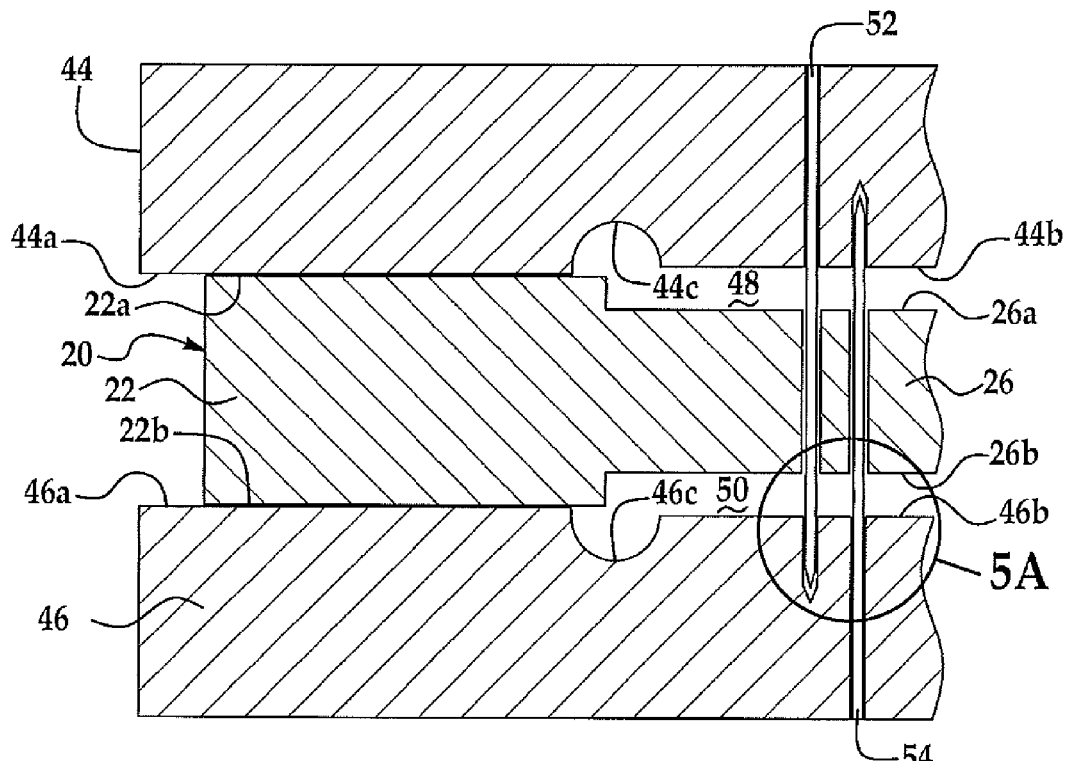
FIG. 5 is a partial cross-sectional view of the molds and core according to FIG. 3 in a closed position where the cross-section is taken along line 5-5 of the core of FIG. 2.
Figure 5A:
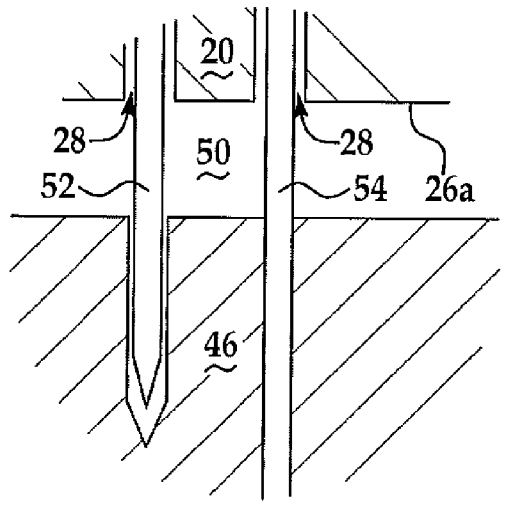
FIG. 5A is an enlarged view of detail A in FIG. 5.

After heating mold parts 44, 46 using heating element 40, manufacture advances to step 32, where core 20 is placed between mold parts 44, 46, which are then moved together to enclose core 20. FIGS. 5 and 5A show this closed arrangement of mold parts 44, 46 and core 20. The cross-sectional view of FIG. 5 is facing parallel to the planar view of FIG. 3 and is arranged on the left side of the image (as shown by section line 5-5 in FIG. 2).

As shown in FIG. 5, mold parts 44, 46 each include a surface 44a, 46a respectively facing core 20. More specifically, top mold part 44 has a surface area at least as large as core 20 such that surface 44a is tightly fit with at least a portion of an upper surface 22a of frame portion 22 when in the closed arrangement. Similarly, bottom mold part 46 has a surface area at least as large as core 20 such that surface 46a is tightly fit with at least a portion of a bottom surface 22b of frame portion 22 when in the closed arrangement. The tight fit about the entire peripheral edge of core 20 prevents the resilient material 14 from leaking during injection as described later.

Web portion 26 is recessed as discussed previously. Therefore, even if mold parts 44, 46 extended along the same plane defined by surfaces 44a, 46a across the entire surface of core 20, a space would be provided between web portion 26 and mold parts 44, 46. In this case, however, it is desirable but not necessary to modify mold parts 44, 46 so that second surfaces 44b, 46b, which are sized for the surface area of web portion 26, are respectively recessed from surfaces 44a, 44a. In effect, this provides a gap 48 between top mold part 44 and core web portion 26 and a gap 50 between bottom mold part 46 and core web portion 26 such that resilient material 14 extends beyond top surface 22a of core frame portion 22 and beyond bottom surface 22b of core frame portion 22 after the completion of injection.

Top mold part 44 includes a plurality of pins 52 fittingly engaged therewith and extending downwardly in the closed arrangement through corresponding bores 28 of core web portion 26. Similarly, bottom mold part 46 includes a plurality of pins 54 fittingly engaged therewith and extending upwardly in the closed arrangement through corresponding bores 28 of core web portion 26. Each pin 52, 54 of a mold 44, 46 therefore extends through core 20, and each ends in a blind hole on the opposite mold. Generally pins 52, 54 are made of high-strength tool steel and are coated as described with respect to core 20. Only two pins are shown by example in FIGS. 5 and 5A, but the total number of pins 52, 54 corresponds to the number of bores 28 in core web portion 26. As can be seen in better detail in FIG. 5A, the circumference of pins 52, 54 is smaller than the circumference of bores 28 such that a layer of resilient material 14 is formed in a gap therebetween during injection.

Arrangement of the pins 52, 54 is not particularly limited. However, it is desirable that pins 52, 54 be alternated in some manner across the surface area of core web portion 26 when in the closed arrangement and that the number of pins 52 is not significantly different from the number of pins 54. For example, the number of pins 52 and pins 54 could be even, and they could alternate from bore-to-bore. Alternating pins 52, 54 from bore-to-bore could make manufacture of mold parts 44, 46 difficult, so a more desirable arrangement may be to alternate groups of pins 52, 54 so that the groups lie in different regions of core web portion 26 in the closed arrangement. A goal of pin placement and number is to assist uniform flow of the resilient material 14 during injection. A large difference in the number of pins 52 and pins 54 could adversely affect this goal. The inventors have successfully prepared a carrier plate 11 where pins 52, 54 of mold parts 44, 46 were grouped in different regions and the ratio of the number of pins 52 to the number of pins 54 was 40/60.

Referring again to FIG. 4, once core 20 is affixed between mold parts 44, 46 in step 32, manufacturing advances to step 34, where the resilient material 14 is injected by an injection molding machine 42. The resilient material 14 should have elasticity and be resistant to high temperatures when cooled. For example, resilient material 14 can be a heat curing silicone rubber. Since the manufacturing process incorporates injection molding for resilient material 14, is it desirable that the resilient material be graded for injection molding. For the performance of carrier plate 11, hardness of the resilient material 14 is also an issue. Silicone rubber having a hardness between 50A and 60A (Shore A hardness scale) has been used as the resilient material 14. Suitable resilient material is available from, for example, Shincor Silicones, Inc. of Akron, Ohio, Dow Corning Corp. of Midland, Mich., Wacker Chemical Corp. of Adrian, Mich. and Momentive Performance Materials of Wilton, Conn.

As shown in FIG. 5, a gate 44c is formed as a recess between surface 44a and second surface 44b of top mold part 44. Similarly, a gate 46c is formed as a recess between surface 46a and second surface 46b of bottom mold part 46. Each gate 44c, 46c is semicircular in shape and extends longitudinally along the area where core frame portion 22 and core web portion 24 meet. The gates 44c, 46c are located on only one end of molds 44, 46 in the illustrated embodiment. However, the invention is not limited to this. For example, gates 44c, 46c could be located on opposing sides of core 20, or circular or annular gates could be located at the center of molds 44, 46. The liquid resilient material 14 is simultaneously injected in each gate 44c, 46c to travel to the gaps 48, 50 between molds 44, 46 and core 20 and to flow into the gap between each pin 52, 54 and its respective bore 28.

Figure 6A:
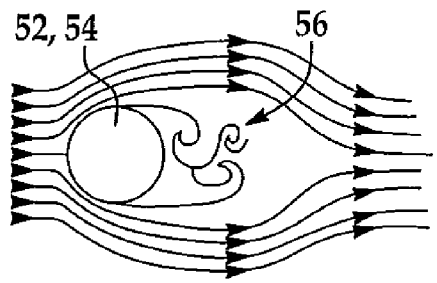
FIGS. 6A to 6C are pictorial illustrations for describing the flow of liquid resilient material during injection molding.

Due to the small size of bores 28, it is difficult to flow resilient material 14 to consistently fill the gap due to the presence of pin 52 or 54. Here, the inventors unexpectedly observed an appreciable improvement in flow of resilient material 14 with the hexagonal arrangement of bores 28 over a conventional square pattern arrangement. Without being bound by theory, it is believed that the increase in spacing to the next downstream mold pin 52 or 54 from its related upstream mold pin 52 or 54 in the hexagonal arrangement overcomes turbulence due to the existence of a low pressure area downstream of each mold pin 52, 54. That is, a resilient material 14 flows generally with respect to pin 52, 54 as shown in FIG. 6A. The flow starts upstream of pin 52, 54 and proceeds to contact pin 52, 54 and pass pin 52, 54 to come back together for laminar flow downstream of pin 52, 54. An area 56 of turbulent flow and low pressure extends downstream of pin 52, 54.

Figure 6B:
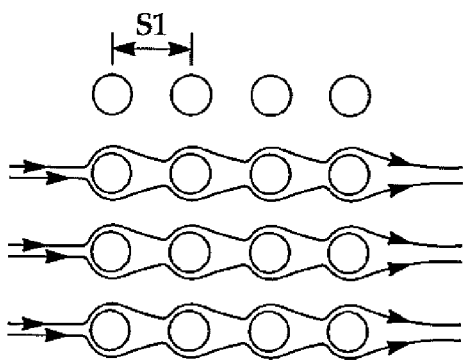
Figure 6C:
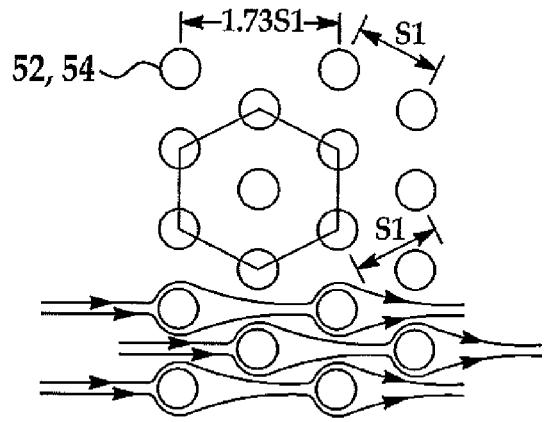

In the illustrated embodiment of FIG. 5, resilient material 14 flows during injection primarily along the major axis of core 20 (that is, along the long side of its rectangular shape). In a square pattern as shown in FIG. 6B, each pin except the first is immediately downstream of another pin. For example, the spacing could be S1 as described previously. However, in the hexagonal arrangement as shown in FIG. 6C, even if the spacing S1 between adjacent pins 52, 54 is unchanged, each downstream pin 52, 54 is about 1.73 times farther away. The inventors theorize that this difference allows the resilient material 14 to substantially or completely return to laminar flow after passing a pin 52, 54 before reaching the next, downstream pin 52, 54.

Returning again to FIG. 4, after the liquid material 14 is injected to fill the gaps at step 34 as previously described, the material cures. For example, silicone cures into rubber when liquid silicone rubber is used.

After curing, mold parts 44, 46 can be pulled apart from the molded part 56 formed of core 20 and resilient material 14 so that the molded part 56 can be machined at step 36 to form carrier plate 11.

Figure 7:
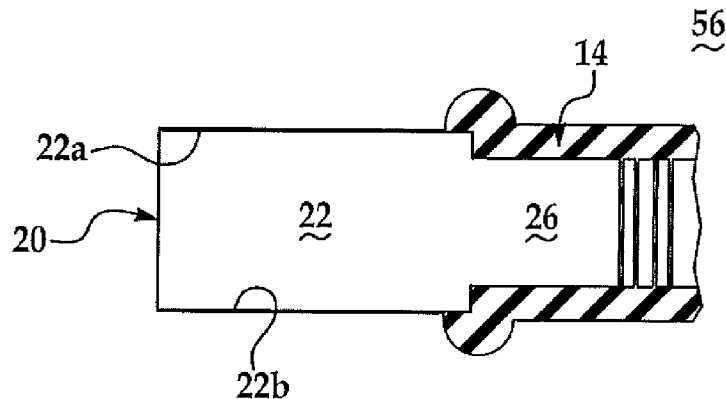
FIG. 7 is a partial cross-sectional view of a molded part made in conformance with the apparatus according to FIGS. 3 and 5.

Namely, the molded part 56 formed of core 20 and resilient material 14 includes resilient material 14 in core web portion 26 that extends beyond surfaces 22a, 22b of core frame portion 22 as shown in FIG. 7. Resilient material 14 also forms a shape on surfaces of the molded part 56 consistent with gates 44c, 46c. Further, core frame portion 22 is generally thicker at this time than when finished. Using a diamond grinding wheel, for example, both surfaces of the molded part 56 are machined to a desired thickness for the finished carrier plate 11. As mentioned above, this thickness can be about 0.35 inches. As shown in FIG. 1A, due to the reduced thickness t1 of core web portion 26 versus core frame portion 22, even after machining opposing surfaces of the molded part 56, carrier plate 11 maintains a layer of resilient material 14 on opposing surfaces of core web portion 26. Each layer has a thickness of t2. Where the total thickness of carrier plate 11 from top surface 16 to bottom surface 18 is 0.35 inches, thickness t1 is about 0.25 inches and thickness t2 of each layer of resilient material is about 0.05 inches. That is, the resilient material 14 is flush with the remainder of the carrier plate 14 within manufacturing tolerances.

Embodiments of the carrier plate 11 allow more components to be processed in each batch of a process due to the use of a hexagonal arrangement of holes 12. That is, the holes 12 in carrier plate 11 are significantly greater in number than a carrier plate using a square pattern. For example, in an existing carrier plate sold by the Assignee has 7,668 holes with a surface area of the core web portion 26 of approximately 10.126 inches by 6.625 inches. The same size inventive carrier plate 11 includes 14,008 holes 12.

Surprisingly, despite the significant reduction in mass of core web portion 26 due to the large number of holes 12, strength and rigidity of core 20 is higher than if the core 20 were drilled with a square pattern of holes with the same spacing. That is, when the spacing between adjacent holes is S1, and the diameter of each hole is constant, core 20, and hence carrier plate 11, is stronger (as measured by a deflection load test) than a core of the same size using a square pattern with the same hole spacing and diameter despite the significant increase in the number of holes 12 in core 20. The increase in the number of holes is in the order of at least 40%. Upon consideration, and without being bound by theory, the inventors believe that since the drilled core gets its stiffness from the small amount of metal left after the holes are drilled, the hexagonal hole pattern provides three axes of this remaining metal instead of just two as with conventional plates.

The disclosed inventive carrier plate 11 includes a unit cell of a hexagonally-shaped regular polygon, each vertex of which has a bore, in addition to including a bore at the center of the polygon. Hence, there are three holes located in the area of each unit cell. This is in contrast to a conventional unit cell in the form of a square where only one hole is located in the area of the unit cell. Where the edge length is the same as shown in FIGS. 6B and 6C, the unit cell areas are different but can be normalized for comparison. In that case, although the area of the hexagonally-shaped unit cell is larger than the area of the square-shaped unit cell, the number of holes per unit cell area is still greater than one.

Carrier plates 11 are used to retain small electronic components during processing, for example during the application of precise amounts of solder paste to the ends of the components. The rubber-lined holes 12 are sized to grip the components and retain them during processing, yet allow the components to be easily inserted and ejected from the rubber. One application in which the inventive carrier plate 11 can be used is as a replacement for part handling plate 10 in the conductive coating process apparatus disclosed in U.S. Pat. No. 4,526,129, which is incorporated herein in its entirety by reference.

Components so processed can range widely in size. When processing small parts, very good precision in the location of the holes through the rubber is desirable due to the sizes and tolerances necessary. The inventors believe that the surprising improvement in plate stiffness is likely responsible for an improved locational accuracy of the component-holding holes 12, which directly and favorably bears on production yield and the overall life of carrier plate 11.

While carrier plates for relatively large parts do not require as much precision in the location of the holes through the rubber, the inventive carrier plate 11 can be successfully used with such parts to improve production yield.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of manufacturing a carrier plate for supporting a plurality of electronic components, comprising:

placing a carrier core between a first mold part and a second mold part, wherein the first mold part includes a facing surface facing the carrier core and a first plurality of pins extending therefrom and the second mold part includes a facing surface facing the carrier core and a second plurality of pins extending therefrom and the carrier core includes:
  a frame portion forming an outer peripheral edge of the carrier core;
  a web portion surrounded by core frame portion and recessed from opposing surfaces of the frame portion facing the facing surfaces of the first mold part and the second mold part; and
  a plurality of hexagonally-arranged bores extending through the web portion and perpendicular to the facing surfaces of the first mold part and the second mold part, and each of the plurality of first and second pins extending through a respective one of the plurality of hexagonally-arranged bores;
  injecting a resilient material through a respective gate in each of the first mold part and the second mold part to form a molded part, wherein the carrier core is placed between the first mold part and the second mold part such that a distance between each upstream one of the plurality of hexagonally-arranged bores and its adjacent downstream one of the plurality of hexagonally-arranged bores is greater than a distance between each bore of the plurality of hexagonally-arranged bores and its nearest adjacent bore; and
  finishing opposing surfaces of the molded part to a desired thickness.

2. The method according to claim 1 wherein injecting the resilient material further comprises:
  injecting a resilient material until gaps between the web portion and the facing surfaces of the first mold part and the second mold part are filled with the resilient material.

3. The method according to claim 1, further comprising:
  heating the first mold part and the second mold part before injecting the resilient material; and wherein a same material forms the carrier core, the first mold part and the second mold part.

4. The method according to claim 1 wherein each of the plurality of first and second pins has a smaller diameter than each of the plurality of hexagonally-arranged bores; and wherein injecting the resilient material further comprises:
  injecting the resilient material into gaps formed when each of the plurality of first and second pins extends through a respective one of the plurality of hexagonally-arranged bores.

5. A method of manufacturing a carrier plate for supporting a plurality of electronic components, comprising:
  placing a carrier core between a first mold part and a second mold part, wherein the first mold part includes a facing surface facing the carrier core and a first plurality of pins extending therefrom and the second mold part includes a facing surface facing the carrier core and a second plurality of pins extending therefrom and the carrier core includes:
  a frame portion forming an outer peripheral edge of the carrier core;
  a web portion surrounded by core frame portion and recessed from opposing surfaces of the frame portion facing the facing surfaces of the first mold part and the second mold part; and
  a plurality of hexagonally-arranged bores extending through the web portion and perpendicular to the facing surfaces of the first mold part and the second mold part, and each of the plurality of first and second pins extending through a respective one of the plurality of hexagonally-arranged bores;
  injecting a resilient material through a respective gate in each of the first mold part and the second mold part to form a molded part, wherein the carrier core is placed between the first mold part and the second mold part such that a distance between each upstream one of the plurality of hexagonally-arranged bores and its adjacent downstream one of the plurality of hexagonally-arranged bores is greater than a distance between each bore of the plurality of hexagonally-arranged bores and its nearest adjacent bore; and
  finishing opposing surfaces of the molded part to a desired thickness; and
  wherein the carrier core is rectangular in shape and the gates in each of the first mold part and the second mold part extend along one edge of the carrier core where the frame portion and the web portion are joined and extend for at least a length of the web portion along the one edge of the carrier core.

6. A method of manufacturing a carrier plate for supporting a plurality of electronic components, comprising:
  placing a carrier core between a first mold part and a second mold part, wherein the first mold part includes a facing surface facing the carrier core and a first plurality of pins extending therefrom and the second mold part includes a facing surface facing the carrier core and a second plurality of pins extending therefrom and the carrier core includes:
  a frame portion forming an outer peripheral edge of the carrier core;
  a web portion surrounded by core frame portion and recessed from opposing surfaces of the frame portion facing the facing surfaces of the first mold part and the second mold part; and
  a plurality of hexagonally-arranged bores extending through the web portion and perpendicular to the facing surfaces of the first mold part and the second mold part, and each of the plurality of first and second pins extending through a respective one of the plurality of hexagonally-arranged bores;
  injecting a resilient material through a respective gate in each of the first mold part and the second mold part to form a molded part, wherein the carrier core is placed between the first mold part and the second mold part such that a distance between each upstream one of the plurality of hexagonally-arranged bores and its adjacent downstream one of the plurality of hexagonally-arranged bores is greater than a distance between each bore of the plurality of hexagonally-arranged bores and its nearest adjacent bore; and
  finishing opposing surfaces of the molded part to a desired thickness; and
  wherein each of the facing surfaces of the first mold part and the second mold part comprises:
    a first surface portion in fitting engagement with at least a portion of the frame portion; and
    a second surface portion recessed from the first surface portion and facing the web portion.

7. The method according to claim 6 wherein each of the gates comprises a recessed portion between at least part of the first surface portion and the second surface portion.

8. The method according to claim 1 wherein the plurality of first pins and the plurality of second pins are no more than 20% different in total number.

9. The method according to claim 1 wherein the plurality of first pins and the plurality of second pins alternate in groups across a surface of the web portion.

10. The method according to claim 1 wherein the plurality of hexagonally-arranged bores is arranged such that a distance between a downstream bore and another bore immediately upstream of the downstream bore in a flow direction of the resilient material is larger than a spacing between adjacent bores forming a hexagonal shape.

11. The method according to claim 1 wherein the first plurality of pins are fixedly engaged with the first mold part and the second plurality of pins are fixedly engaged with the second mold part.

12. The method according to claim 1 wherein outer tips of the first plurality of pins opposite from the facing surface of the first mold part fit into a respective blind hole in the facing surface of the second mold part, and outer tips of the second plurality of pins opposite from the facing surface of the second mold part fit into a respective blind hole in the facing surface of the first mold part.

13. The method according to claim 1 wherein outer tips of the first plurality of pins opposite from the facing surface of the first mold part fit into a respective blind hole in the facing surface of the second mold part, and outer tips of the second plurality of pins opposite from the facing surface of the second mold part fit into a respective blind hole in the facing surface of the first mold part.

14. The method according to claim 1, further comprising:
forming the carrier plate of a sheet of material having a first surface and an opposed second surface by drilling the plurality of hexagonally-arranged bores through the sheet of material in equidistantly-spaced rows and columns, wherein bores in every other row align to form a respective column such that bores of the hexagonally-arranged bores for a plurality of regular hexagons surrounding a respective central bore.

15. The method according to claim 5, further comprising:
forming the carrier plate of a sheet of material having a first surface and an opposed second surface by drilling the plurality of hexagonally-arranged bores through the sheet of material in equidistantly-spaced rows and columns, wherein bores in every other row align to form a respective column such that bores of the hexagonally-arranged bores for a plurality of regular hexagons surrounding a respective central bore.

16. The method according to claim 6, further comprising:
forming the carrier plate of a sheet of material having a first surface and an opposed second surface by drilling the plurality of hexagonally-arranged bores through the sheet of material in equidistantly-spaced rows and columns, wherein bores in every other row align to form a respective column such that bores of the hexagonally-arranged bores for a plurality of regular hexagons surrounding a respective central bore.

* * * * *